US011370038B2

(12) United States Patent
Ono et al.

(10) Patent No.: US 11,370,038 B2
(45) Date of Patent: Jun. 28, 2022

(54) DRILL, DRILLING UNIT, AND DRILLING METHOD

(71) Applicant: SUBARU CORPORATION, Tokyo (JP)

(72) Inventors: Ryohei Ono, Tokyo (JP); Masao Watanabe, Tokyo (JP); Tatsuo Nakahata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/671,420

(22) Filed: Nov. 1, 2019

(65) Prior Publication Data
US 2020/0180045 A1 Jun. 11, 2020

(30) Foreign Application Priority Data

Dec. 10, 2018 (JP) .............................. JP2018-231043

(51) Int. Cl.
*B23B 51/06* (2006.01)
*B23B 49/02* (2006.01)
*B23B 35/00* (2006.01)

(52) U.S. Cl.
CPC ............ *B23B 49/023* (2013.01); *B23B 35/00* (2013.01); *B23B 51/06* (2013.01); *B23B 2250/12* (2013.01); *B23B 2251/50* (2013.01)

(58) Field of Classification Search
CPC ... B23B 51/06; B23B 2250/12; B23B 47/287; B23B 47/28; B23B 49/02; B23B 49/023; B23B 2251/50; B23B 35/00
See application file for complete search history.

(56) References Cited

U.S. PATENT DOCUMENTS 1,962,241 A 6/1934 Hawkinson
3,054,308 A 9/1962 Larry
(Continued)

FOREIGN PATENT DOCUMENTS

CN 103527097 A 1/2014
CN 105 478 866 A 4/2016
(Continued)

OTHER PUBLICATIONS

Extended European Search Report dated Jul. 3, 2020, in Patent Application No. 20150068.3 (15 pages).
(Continued)

*Primary Examiner* — Chwen-Wei Su
(74) *Attorney, Agent, or Firm* — Smith, Gambrell & Russell, LLP

(57) ABSTRACT

According to one implementation, a drill includes: a body without a back taper and a cutting edge part. The body has a flow path of a cutting oil. The flow path is branched to first and second flow paths inside the body. The cutting edge part has a first supply port that supplies the cutting oil toward a workpiece. The first supply port is an outlet of the first flow path. The body has a second supply port that supplies the cutting oil to a clearance between the body and a bush for positioning the body. The second supply port is an outlet of the second flow path. The second flow path has a pressure loss by which the cutting oil is not scattered from the second supply port in a radial direction of the body but exuded from the second supply port.

20 Claims, 11 Drawing Sheets

(56) References Cited

U.S. PATENT DOCUMENTS

| | | | |
|---|---|---|---|
| 3,071,030 A | 1/1963 | Larry | |
| 3,120,766 A | 2/1964 | Zager | |
| 3,199,382 A | 8/1965 | Andreasson | |
| 3,320,832 A | 5/1967 | Jensen | |
| 3,543,613 A | 12/1970 | Obloy | |
| 3,767,315 A | 10/1973 | Burks | |
| 3,841,417 A | 10/1974 | Crawford, Jr. | |
| 4,643,621 A | 2/1987 | Fuller, Jr. et al. | |
| 4,693,642 A * | 9/1987 | Mair | B23B 29/02 408/59 |
| 5,312,209 A * | 5/1994 | Lindblom | B23B 51/02 408/227 |
| 5,478,176 A * | 12/1995 | Stedt | B23B 51/02 408/229 |
| 5,540,526 A * | 7/1996 | Hyatt | B23B 29/02 408/1 R |
| 5,704,739 A | 1/1998 | Bridenstine et al. | |
| 5,993,120 A * | 11/1999 | Giessler | B23G 5/005 408/222 |
| 6,045,301 A | 4/2000 | Kammermeier et al. | |
| 6,210,083 B1 | 4/2001 | Kammermeier et al. | |
| 6,280,126 B1 | 8/2001 | Slocum et al. | |
| 6,524,034 B2 | 2/2003 | Eng et al. | |
| 7,556,458 B2 | 7/2009 | Heilmann et al. | |
| 7,938,048 B2 | 5/2011 | Nyström | |
| 8,876,442 B2 * | 11/2014 | Saito | B23Q 11/1023 408/59 |
| 8,944,732 B2 | 2/2015 | Osawa et al. | |
| 9,144,853 B2 | 9/2015 | Bitzer et al. | |
| 9,636,753 B2 | 7/2017 | Anson et al. | |
| 10,537,943 B2 | 1/2020 | Jäger et al. | |
| 2001/0031182 A1 | 10/2001 | Widin | |
| 2007/0172323 A1 | 7/2007 | Radkowitsch et al. | |
| 2011/0027028 A1 | 2/2011 | Sadaoka et al. | |
| 2014/0348603 A1 | 11/2014 | Miyajima et al. | |
| 2015/0298222 A1 * | 10/2015 | Ach | B23B 51/02 407/11 |
| 2015/0328696 A1 | 11/2015 | Wang et al. | |
| 2015/0360302 A1 | 12/2015 | Guter | |
| 2016/0263666 A1 | 9/2016 | Myers et al. | |
| 2018/0133809 A1 | 5/2018 | Brunner | |
| 2019/0030623 A1 | 1/2019 | Ono et al. | |
| 2020/0261990 A1 | 8/2020 | Ono et al. | |

FOREIGN PATENT DOCUMENTS

| | | |
|---|---|---|
| DE | 90 16 440 U1 | 4/1991 |
| DE | 10 2010 002 669 A1 | 9/2011 |
| EP | 2 266 733 A1 | 12/2010 |
| EP | 2979795 A1 | 2/2016 |
| EP | 3434402 A1 | 1/2019 |
| EP | 3666434 A1 | 6/2020 |
| JP | S43-029791 | 12/1968 |
| JP | 1997-085533 A | 3/1997 |
| JP | H11-138319 A | 5/1999 |
| JP | 2006-102868 A | 4/2006 |
| JP | 2009-083092 A | 4/2009 |
| JP | 2009-184036 A | 8/2009 |
| JP | 2009/233780 A | 10/2009 |
| JP | 2010-284752 A | 12/2010 |
| JP | 2015-120216 A | 7/2015 |
| JP | 2019-025573 A | 2/2019 |

OTHER PUBLICATIONS

Second Japanese Office Action dated Nov. 6, 2019 in JP 2017-146120 (5 pages in Japanese with English Translation).

Extended European Search Report dated Dec. 19, 2018 in EP 18179484.3.

Japanese Office Action dated Jun. 4, 2019 in JP 2017-146120 (5 pages in Japanese with English Translation).

Extended European Search Report dated May 15, 2020, in EP Application No. 19207608.1 (11 pages).

Office Action received in U.S. Appl. No. 15/992,682 dated Apr. 15, 2019 (14 pages).

Office Action received in U.S. Appl. No. 15/992,682 dated Nov. 26, 2019 (13 pages).

Office Action received in U.S. Appl. No. 15/992,682 dated Jun. 4, 2020 (13 pages).

Office Action dated Dec. 11, 2020 in U.S. Appl. No. 15/992,682 (13 pages).

Office Action dated Apr. 16, 2021 in U.S. Appl. No. 15/992,682 (6 pages).

Office Action dated Jun. 21, 2021 in U.S. Appl. No. 16/740,714 (11 pages).

Taiwanese First Office Action dated Sep. 17, 2021 in Taiwanese Patent Application No. 107123200 (7 Pages in Chinese with English translation).

European Extended Search Report dated Oct. 19, 2021 in European Patent Application No. 21170370.7 (10 pages).

Final Office Action dated Jan. 7, 2022 is U.S. Appl. No. 16/740,714 (14 pages).

Office Action dated May 11, 2022 in European Patent Application No. 18179484.3 (14 pages).

Non-Final Office Action dated Apr. 25, 2022 in U.S. Appl. No. 16/740,714 (7 pages).

* cited by examiner

US 11,370,038 B2

DRILL, DRILLING UNIT, AND DRILLING METHOD

CROSS REFERENCES TO RELATED APPLICATIONS

This application is based upon and claims the benefit of priority from Japanese Patent Application No. 2018-231043, filed on Dec. 10, 2018; the entire contents of which are incorporated herein by reference.

FIELD

Implementations described herein relate generally to a drill, a drilling unit, and a drilling method.

BACKGROUND

Conventionally, a drilling method using a drilling jig, such as a drilling plate and/or a guide bush, is known as one of drilling methods. As a specific example, a drilling method for deep hole processing with high precision using a guide bush, which can supply cutting oil inside, has been proposed (for example, refer to Japanese Patent Application Publication JP2015-120216 A).

In drilling using a drill, supplying cutting oil leads to improvement in drilling precision and a tool life. Accordingly, a technique to form a flow path of cutting oil inside a drill to supply the cutting oil toward a workpiece from a cutting edge of the drill is known. As a specific example, a drill in which discharge ports of cutting oil have been formed in cutting edges in addition to lands has been proposed (for example, refer to Japanese Patent Application Publication JP2009-83092 A).

An object of the present invention is to allow drilling with higher precision in the case of drilling by inserting a drill into a guide bush.

SUMMARY OF THE INVENTION

In general, according to one implementation, a drill includes: a body without a back taper and a cutting edge part. The body has a flow path of a cutting oil inside. The flow path is branched to a first flow path and a second flow path inside the body. The cutting edge part is integrated with the body. The cutting edge part has a first supply port that supplies the cutting oil toward a workpiece. The first supply port is an outlet of the first flow path. The body has a second supply port that supplies the cutting oil to a clearance formed between the body and a bush for positioning the body. The bush is used by inserting the body inside the bush. The second supply port is an outlet of the second flow path. The outlet of the second flow path is formed on an outer peripheral surface of the body. The second flow path has a pressure loss by which the cutting oil is not scattered from the second supply port in a radial direction of the body but exuded from the second supply port.

Further, according to one implementation, a drilling unit includes the above-mentioned drill and the bush.

Further, according to one implementation, a drilling method for producing a drilled product includes: using at least the above-mentioned drill and the bush for drilling the workpiece; and supplying the cutting oil.

DETAILED DESCRIPTION

A drill, a drilling unit, and a drilling method according to implementations of the present invention will be described with reference to the accompanying drawings.
(First Implementation)
(Structure and Function)

Figure 1:
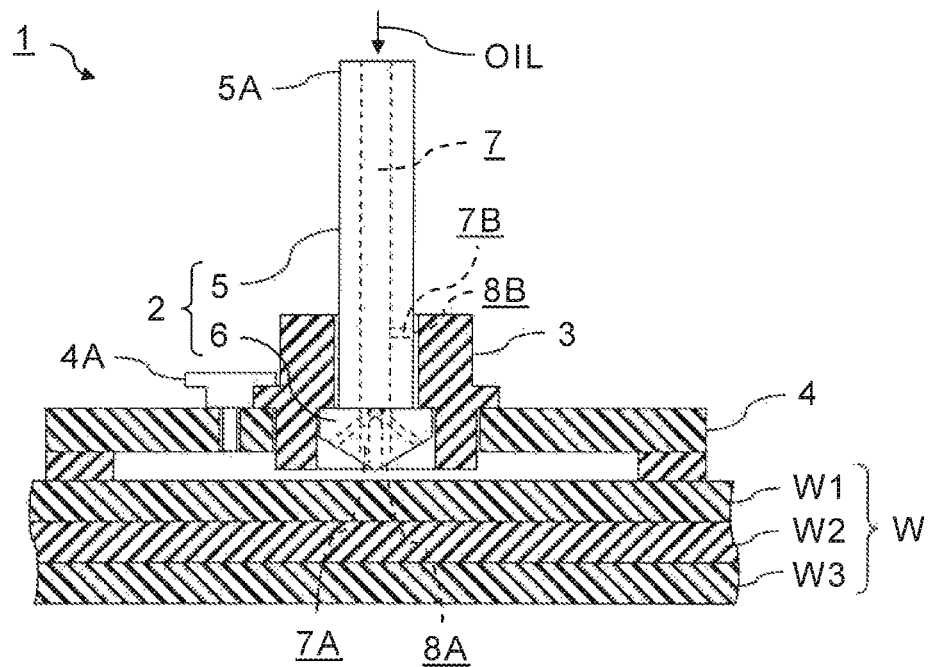
FIG. 1 shows a structure of a drilling unit including a drill according to the first implementation of the present invention.
Figure 2:
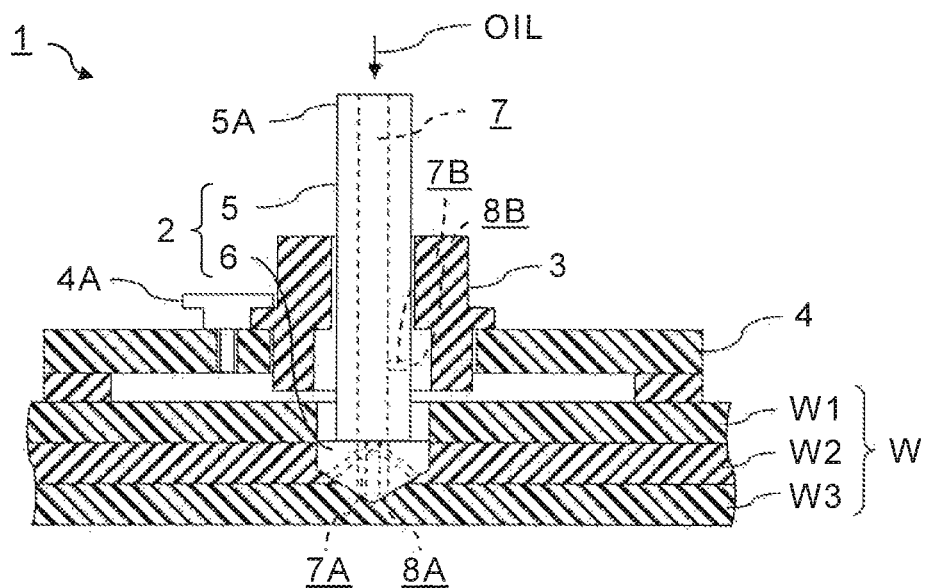
FIG. 2 shows a state where the drilling unit shown in FIG. 1 is drilling a workpiece.

FIG. 1 shows a structure of a drilling unit including a drill according to the first implementation of the present invention. FIG. 2 shows a state where the drilling unit shown in FIG. 1 is drilling a workpiece.

A drilling unit 1 drills a workpiece W using a handheld drill driving device, having at least a rotor for rotating a desired cutting tool. The drilling unit 1 has a drill 2, a guide bush 3, and a drilling plate 4. The guide bush 3 is used for positioning the drill 2, by being inserted into a through hole, for positioning, formed in the drilling plate 4 or another drilling jig.

Since the drilling plate 4 should have a structure to be easily placed depending on the structure of the workpiece W, it is often appropriate that the drilling plate 4 is produced by a user of the drilling unit 1. Therefore, the drilling unit 1 may be composed of the drill 2 and the guide bush 3, without the drilling plate 4 being an element of the drilling unit 1. The drilling plate 4 shown in the figures has a structure in which a through hole for inserting the guide bush 3 has been formed on a platy member. The guide bush 3 inserted into the through hole of the drilling plate 4 is fixed to the drilling plate 4 by a setscrew 4A.

The workpiece W is a laminate material composed by overlapping three plate materials W1, W2, and W3. As a specific example, the workpiece W composed by overlapping the plate material W1 made of CFRP (carbon fiber reinforced plastics), the plate material W2 made of aluminum, and the plate material W3 made of titanium can be an object to be drilled by the drilling unit 1. As a matter of course, a laminate material, a simple platy portion, a block-shaped portion or the like, each made of a same material, such as a metal or a composite material, can be an object to be drilled by the drilling unit 1.

The drill 2 has a body 5, without a back taper, and a cutting edge part 6 forming the desired number of cutting edges. The drill 2 held by a handheld drill driving device or the like is also called a drill bit in order to distinguish from a drill driving device. One end of the body 5 is used as a shank 5A for holding the drill 2 with a holder of a drill driving device while the other end of the body 5 is integrated with the cutting edge part 6. At least the cutting edge part 6 side of the body 5 without a back taper has a constant diameter, and is inserted into the guide bush 3.

In the example shown in FIG. 1, the diameter of the cutting edge part 6 is longer than the diameter of the body 5. Therefore, the guide bush 3 has a cylindrical structure having a step through hole consisting of the first hole, having the first diameter, which guides the cutting edge part 6 in the workpiece W side, and the second hole, having the second diameter smaller than the first diameter, which guides the body 5 on the opposite side of the workpiece W.

Since the guide bush 3 is used by being inserted into a through hole for positioning formed in the drilling plate 4 or the like, the outline of the guide bush 3 in the workpiece W side is determined so that the tolerance between the outline of the guide bush 3 in the workpiece W side and the diameter of the through hole for positioning formed in the drilling plate 4 or the like become a tolerance corresponding to clearance fit.

When a ring-shaped convex portion is formed on an outer surface of the guide bush 3, the guide bush 3 can be positioned in the tool axis direction by making a ring-shaped stepped surface, perpendicular to the tool axis direction, contact with a surface of the drilling plate 4 or the like, as shown in the figures. Furthermore, the guide bush 3 can be fixed to the drilling plate 4 by holding the ring-shaped convex portion of the guide bush 3 between the setscrew 4A and the drilling plate 4, as shown in the figures.

The cutting edges of the drill 2 may be attached to the cutting edge part 6 interchangeably. A drill whose cutting edge can be exchanged as an insert or a head is also called an insert drill. When the drill 2 is an insert drill, the body 5 and a portion of the cutting edge part 6 except the cutting edges also function as a holder for holding each cutting edge interchangeably.

A two flute insert, which has been on the market for conventional insert drills, can also be used as an insert for the drill 2. Therefore, the drill 2 may be composed of the body 5 and the cutting edge part 6 having a structure, in which each cutting edge can be attached while an existing general-purpose insert may be used as the cutting edges.

The diameter of the end portion in the holder side of the body 5, which is not inserted in the guide bush 3, may be larger than not only the inside diameter of the guide bush 3 but the diameter of the cutting edge part 6 in order to secure rigidity. In other words, another connecting member, such as the shank 5A or a screw, thicker than the diameter of the body 5 may be coupled to the holder side of the body 5. In that case, the drill 2 is a non-straight drill in which the diameter of the cutting edge part 6 is larger than the diameter of the body 5 in the cutting edge part 6 side. Also in that case, the diameter of a portion of the body 5 in the cutting edge part 6 side, which is used by being inserted in the guide bush 3, is constant.

Regardless of the diameter of the shank 5A, it is appropriate to form a flute or flutes for discharging chips in the cutting edge part 6 side of the body 5. For example, helical flutes can be formed in the cutting edge part 6 side of the body 5 similarly to a twist drill. Alternatively, linear flutes may be formed in the cutting edge part 6 side of the body 5 similarly to a straight fluted drill.

The length of a portion of the body 5, having a constant diameter without a back taper, is determined so that the drill 2 can be fed out in the tool axis direction. Therefore, the longer the length of the portion of the body 5 without a back taper is, the longer a distance that the drill 2 can be fed out in the tool axis direction can be. Accordingly, the diameters of the body 5, including a portion used as the shank 5A for holding with a holder, may be constant as shown in the figures.

As a matter of course, not only limited to the examples shown in the figures, the diameter of the cutting edge part 6 may be same as the diameter of the body 5 to compose a straight drill, or the cutting edge part 6 and the body 5 may be made of a same material to compose a solid type drill. Also in that case, the cutting edge part 6 side of the body 5 does not have a back taper, and a tool diameter is constant.

When the drill 2 is an insert drill as described above, the price of the drill 2 can be reduced since only a cutting edge made of an expensive material, such as carbide or ceramics, can be exchanged when the cutting edge is worn while the body 5 is made of a cheap material, such as high-speed steel, similarly to the conventional insert drill. Since there are few straight drills without a back taper in recent years, to manufacture a straight drill newly requires large scale equipment. By contrast, since a holder for an insert drill whose diameter of cutting edge is larger than the diameter of the holder does not contact with a workpiece, a holder without a back taper has also been marketed. Therefore, when the drill 2 is an insert drill, the drill 2 can be manufactured using the conventional equipment as much as possible.

At least one flow path 7 of a cutting oil is formed inside the body 5. The cutting oil is supplied to the flow path 7 in the body 5 from the holder side of the body 5. Therefore, it is practical to form an entrance of cutting oil on an end face in the holder side of the body 5. In the example shown in the figures, the linear flow path 7 of cutting oil has been formed on the tool axis of the body 5 whose diameter is constant. In this case, the body 5 has a cylindrical structure.

Note that, the flow path 7 of the cutting oil may be formed at a position which is not on the tool axis of the body 5. Alternatively, a plurality of the flow paths 7, parallel to the tool axis, may be formed in the body 5.

The cutting oil supplied to the flow path 7 in the body 5 is mainly supplied from the cutting edge part 6 to the workpiece W through the flow path 7 in the body 5. Therefore, at least one outlet of the cutting oil is formed in the cutting edge part 6. Each outlet of the cutting oil is used as the first supply port 8A for supplying the cutting oil toward the workpiece W from the tip of the drill 2. In the example shown in the figures, the four first supply ports 8A have been formed in the cutting edge part 6 of the drill 2.

Furthermore, some of the cutting oil supplied to the flow path 7 in the body 5 is supplied to a space formed between the guide bush 3 and the body 5. Then, the cutting oil supplied to the space is used for lubrication between the guide bush 3 and the body 5. For that purpose, the body 5 has the second supply port 8B or the second supply ports 8B for supplying the cutting oil to the gap formed between the guide bush 3 and the body 5.

Accordingly, the flow path 7 of the cutting oil can be branched to the first flow paths 7A and the second flow paths 7B inside the drill 2. Thus, the cutting oil can be supplied to the first supply ports 8A through the first flow paths 7 while the cutting oil can be supplied to the second supply ports 8B through the second flow paths 7B. Thereby, the structure of the body 5 can be simplified with one entrance of the cutting oil into the body 5.

It is appropriate to open each second supply port 8B on the outer periphery of the body 5 in order to supply sufficient amount of the cutting oil to the clearance gap formed between the guide bush 3 and the body 5. In particular, it is appropriate to form the second flow paths 7B and the second supply ports 8B so that the central axes of holes, which forms the second flow paths 7B and the second supply ports 8B, are directed toward interior surface of the guide bush 3.

Therefore, for example, the second supply port 8B can be opened on the outer periphery of the body 5 by forming the flow path 7 parallel to the tool axis and branching the second flow path 7B in the direction perpendicular to the tool axis. When the central axis of the second flow path 7B is made perpendicular to the tool axis, processing for forming the second flow path 7B in the body 5 becomes easy.

Alternatively, the second flow path 7B oblique toward the workpiece W side may be formed in the body 5 so that the cutting oil promptly permeates the workpiece W side through the clearance formed between the guide bush 3 and the body 5. Therefore, the second flow path 7B can also be formed in the body 5 so that an angle formed between the central axis of the second flow path 7B and the tool axis becomes not less than 10 degrees and not more than 90 degrees. When flutes for discharging chips are formed in the body 5, the second supply port 8B may be opened in a flute or in a margin portion formed between the flutes.

As long as oil film of the cutting oil is formed, lubrication between the guide bush 3 and the body 5 can be fully obtained. On the other hand, the cutting oil supplied toward the workpiece W from the first supply ports 8A formed in the cutting edge part 6 is used for the purpose of discharging chips, reducing cutting resistance, cooling or the like.

Therefore, while most of the cutting oil is supplied to the workpiece W from the first supply ports 8A, supplying a minute amount of the cutting oil to the second supply port 8B or the second supply ports 8B leads to effective use of the cutting oil. Accordingly, it is preferable to form the flow paths 7 inside the body 5 so that the quantity of the cutting oil supplied to the second supply port 8B or the second supply ports 8B is less than the quantity of the cutting oil supplied to the first supply ports 8A. For that reason, the single second supply port 8B may be formed as shown in the figures, for example. Thereby, the structure of the body 5 can be simplified with allocating appropriate amounts of the cutting oil. Note that, a plurality of the second supply ports 8B may be formed on the body 5 in order to obtain a sufficient amount of supply of the cutting oil to the space between the guide bush 3 and the body 5 regardless of drilling conditions.

When the workpiece W is drilled by the drill 2, the drill 2 is fed out in the tool axis direction with making the body 5 slidably fit to the guide bush 3 as shown in FIG. 2. Therefore, a relative position of the second supply port 8B to the guide bush 3 changes. It is desirable to supply the cutting oil to the space formed between the guide bush 3 and the body 5 at the latest by the time drilling starts, i.e., until the cutting edges of the drill 2 contact the workpiece W.

For that reason, the second supply port 8B can be formed at the position where the second supply port 8B opens inside the guide bush 3 in the state that the cutting edge part 6 is not protruding from inside the guide bush 3 as exemplified in FIG. 1. Thereby, the cutting oil can be certainly supplied between the guide bush 3 and the body 5 before drilling starts.

When the feeding amount of the drill 2 is longer than the length of the portion of the guide bush 3, which slidably fits the body 5, the second supply port 8B is exposed outside the portion of the guide bush 3, which slidably fits the body 5, as exemplified in FIG. 2. Nevertheless, the lubricity between the guide bush 3 and the body 5 can be maintained since oil film of the cutting oil remains between the guide bush 3 and the body 5 once the cutting oil is supplied between the guide bush 3 and the body 5.

What is necessary in order to direct the second supply port 8B inside the guide bush 3 which slidably fits the body 5 as much as possible after applying a feed to the drill 2 is to form the second supply port 8B at a position where the second supply port 8B opens at the end portion inside the guide bush 3 on the opposite side to the workpiece W at the time when the tip of the cutting edge part 6 has contacted the workpiece W. Therefore, when a gap is formed between the guide bush 3 and the workpiece W as shown in the figures, a position of the second supply port 8B may be determined in consideration of a distance between the guide bush 3 and the workpiece W.

A drilled product can be manufactured by drilling the workpiece W with supplying the cutting oil using at least the drill 2 and the guide bush 3 which have the above-mentioned structures.

As described above, the drilling unit 1 and the drilling method use the drill 2, used by being inserted in the guide bush 3, without a back taper and having at least one oil hole for supplying a cutting oil between the guide bush 3 and the drill 2.

Effects

According to the drilling unit 1 and the drilling method, the accuracy in drilling can be improved. The reason is as follows.

Figure 3:
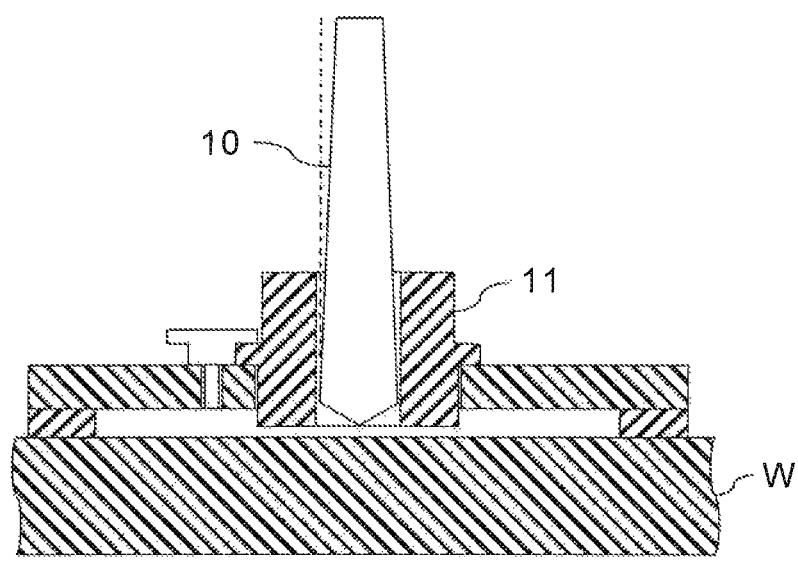
FIG. 3 shows an example case of drilling using the conventional straight drill having a back taper and the guide bush.

FIG. 3 shows an example case of drilling using the conventional straight drill 10 having a back taper and the guide bush 11.

The typical drill 10 has a back taper. The back taper is formed so that the drill 10 does not contact with inner walls of a hole even when the drill 10 expands with heat during drilling. The back taper is standardized, and the taper which becomes thin toward the direction of a shank is formed in the drill 10 so that the diameter of the drill 10 is thinned by 0.04 mm to 0.1 mm per 100 mm in length.

On the other hand, in the case of using the guide bush 11 with inserting the drill 10, the more the drill 10 is fed out to the workpiece W, the larger the gap between the drill 10 and the guide bush 11 becomes. As a result, the accuracy of positioning of the drill 10 deteriorates and it leads to the degradation of a drilling accuracy.

On the contrary, in the case of the drill 2 without a back taper, even when the drill 2 is fed out with guiding by the guide bush 3, the gap between the drill 2 and the guide bush 3 does not become larger. In addition, cutting oil is supplied as lubricating oil between the drill 2 and the guide bush 3. Therefore, the frictional force between the drill 2 and the guide bush 3 can be reduced fully. As a result, even when the drill 2 without a back taper expands with heat, transmission fit between the drill 2 and the guide bush 3 is maintainable. Thereby, the deterioration in the accuracy of positioning of the drill 2 can be prevented and drilling quality can be improved.

As mentioned above, candidates of a material of the workpiece W, for which drilling quality can be improved, include a metal, such as aluminum or titanium, a composite material, such as CFRP, which consists of a resin reinforced with a fiber and a laminate material which consists of overlapped metal and composite material.

(Second Implementation)

Figure 4:
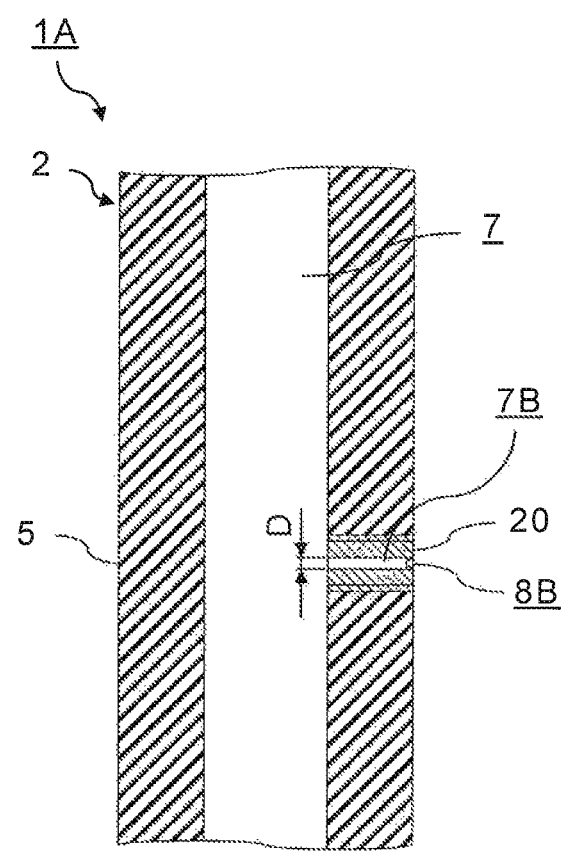
FIG. 4 is an enlarged vertical longitudinal sectional view showing a structure of the body composing the drill according to the second implementation of the present invention.
Figure 5:
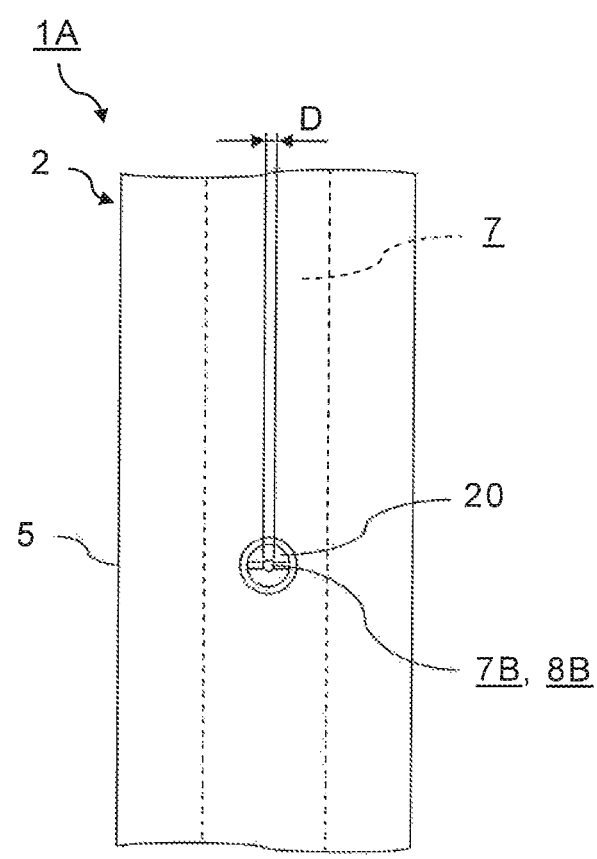
FIG. 5 is a right side view of the body shown in FIG. 4.

FIG. 4 is an enlarged vertical longitudinal sectional view showing a structure of a body composing a drill according to the second implementation of the present invention. FIG. 5 is a right side view of the body shown in FIG. 4.

The drilling unit 1A in the second implementation shown in FIG. 4 is different from the drilling unit 1 in the first implementation in the point that the second flow path 7B formed in the body 5 composing the drill 2 is made exchangeable. Other structures and functions of the drilling unit 1A in the second implementation does not substantially differ from those of the drilling unit 1 in the first implementation. Therefore, only the body 5 composing the drill 2 is illustrated. Then, same signs are attached to the same elements and corresponding elements and explanation thereof is omitted.

As shown in FIG. 4 and FIG. 5, a through hole having a diameter larger than that of the second flow path 7B can be formed at the position of the body 5 at which the second flow path 7B should be formed, and a female screw can be formed inside the through hole. On the other hand, a cylindrical member 20 of which outer surface forms a male screw and which has the second flow path 7B along the center can be fastened to the female screw formed in the through hole of the body 5. That is, the cylindrical member 20 in which the second flow path 7B is formed can be inserted into the through hole which has been formed in the body 5.

Then, the member 20 can be detached and attached from and to the body 5 of the drill 2. In the example shown in FIG. 4 and FIG. 5, a groove for a flat-bladed screwdriver is formed in the end surface in the outside of the member 20 so that the member 20 can be easily detached from and attached to the body 5 of the drill 2.

Thereby, preparing the members 20 in which the second flow paths 7B and the second supply ports 8B having diameters D different from each other have been formed allows changing the size of the second flow path 7B and the second supply port 8B by exchanging one of the members 20 with another one. In this case, any one of the members 20 forming the second supply ports 8B and the second flow paths 7B in different sizes respectively is to be attached to the body 5 of the drill 2 so that the member 20 can be exchanged.

As a specific example, the member 20 of which the diameter D of the second flow path 7B and the second supply port 8B is 0.5 mm and the member 20 of which the diameter D of the second flow path 7B and the second supply port 8B is 1 mm may be prepared, and one of them can be chosen in accordance with the drilling conditions. As a matter of course, the member 20 in which the second flow path 7B and the second supply port 8B having another diameter D have been formed may be prepared.

When the diameter D of the second flow path 7B and the second supply port 8B is determined to an appropriate size in accordance with the drilling conditions, the cutting oil supplied to the flow path 7 of the body 5 from a drill driving device can be distributed to the first flow paths 7A and the second flow path 7B with appropriate amounts. Specifically, supplying an excess quantity of the cutting oil to the gap between the guide bush 3 and the body 5 from the second supply port 8B can be prevented while supplying an insufficient quantity of the cutting oil to the gap between the guide bush 3 and the body 5 from the second supply port 8B can be prevented.

The important drilling conditions which should be taken into consideration in determining the diameter D of the second flow path 7B and the second supply port 8B as an appropriate size include a cutting resistance and an oil pressure of the cutting oil supplied to the drill 2 from a drill driving device. Specifically, when the oil pressure of the cutting oil supplied to the body 5 of the drill 2 from a drill driving device is high enough, sufficient quantity of the cutting oil can be injected towards the workpiece W from the first supply ports 8A even when the cutting resistance is large. On the contrary, when the diameter D of the second flow path 7B and the second supply port 8B is set excessively large in the case where the oil pressure of the cutting oil supplied to the body 5 of the drill 2 from a drill driving device is low and the cutting resistance is large, an excess amount of the cutting oil may be supplied to the gap between the guide bush 3 and the body 5 from the second supply port 8B while the amount of the cutting oil supplied from the first supply ports 8A to the workpiece W may become insufficient.

As main conditions which influence to the cutting resistance, a depth of hole to be drilled, a material of the workpiece W, and a material of cutting edges are mentioned. That is, the cutting resistance changes in accordance with a depth of hole to be drilled, a material of the workpiece W, and a material of the cutting edges. Accordingly, the diameter D of the second flow path 7B and the second supply port 8B can be changed in accordance with a pressure of the cutting oil supplied from a drill driving device to the drill 2, a depth of hole to be drilled, a material of the workpiece W, and a material of the cutting edges.

More specifically, when the cutting resistance is small and a supply pressure of the cutting oil from a drill driving device is high, the diameter D of the second flow path 7B and the second supply port 8B can be made large so that a sufficient quantity of the cutting oil can be led from the second flow path 7B and the second supply port 8B to the gap between the guide bush 3 and the body 5. On the contrary, when the cutting resistance is large and the supply pressure of the cutting oil is low, the diameter D of the second flow path 7B and the second supply port 8B can be made small so that most part of the cutting oil is prevented from being supplied from the second flow path 7B and the second supply port 8B to the gap between the guide bush 3 and the body 5 while the amount of the cutting oil supplied from the first supply ports 8A to the workpiece W can be secured.

Some drilling examinations can experientially determine a size of the second flow path 7B and the second supply port 8B appropriate for every conditions, such as a pressure of the cutting oil supplied from a drill driving device to the drill 2, a depth of hole to be drilled, a material of the workpiece W and a material of the cutting edges.

According to the above-mentioned drilling unit 1A in the second implementation, the size of the second flow path 7B and the second supply port 8B for supplying the cutting oil to the space between the guide bush 3 and the body 5 can be adjusted. Thereby, the cutting oil supplied from a drill driving device to the drill 2 can be distributed to a part to be drilled of the workpiece W, and the space between the guide bush 3 and the body 5 with adequate amounts.

When flutes for discharging chips are formed in the body 5 of the drill 2, the second flow path 7B and the second supply port 8B may be formed on a flute or a margin of the body 5, similarly to the first implementation. Therefore, the through hole and the female screw for inserting the member 20 can also be formed on a flute or margin of the body 5. Then, the member 20 can be attached to the flute or margin of the body 5.

(Third Implementation)

Figure 6:
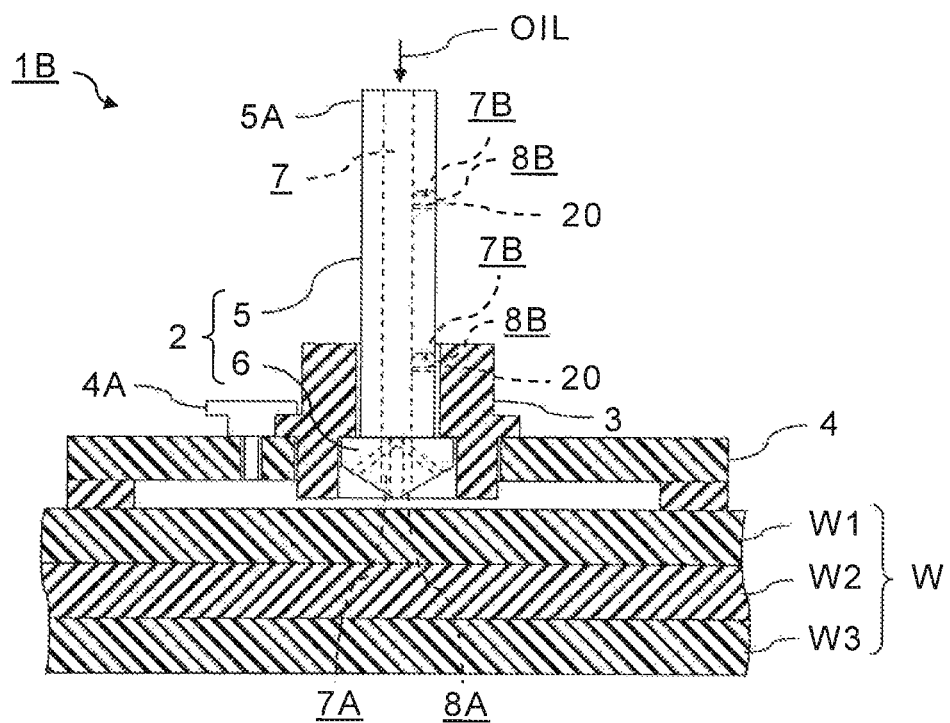
FIG. 6 shows a structure of a drilling unit including a drill according to the third implementation of the present invention.
Figure 7:
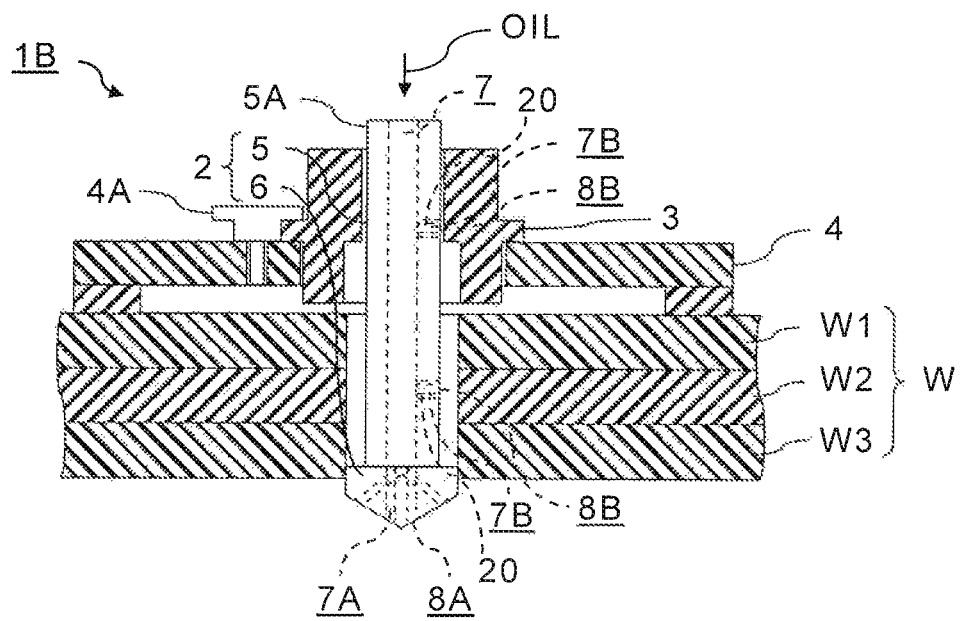
FIG. 7 shows a state where the drilling unit shown in FIG. 6 is drilling a workpiece.

FIG. 6 shows a structure of a drilling unit including a drill according to the third implementation of the present invention. FIG. 7 shows a state where the drilling unit shown in FIG. 6 is drilling a workpiece.

The drilling unit 1B in the third implementation shown in FIG. 6 is different from the drilling unit 1A in the second implementation in the point that members 20 each forming the second flow path 7B and the second supply port 8B can be attached at positions different in the tool axis direction of the drill 2. Other structures and functions of the drilling unit 1B in the third implementation does not substantially differ from those of the drilling unit 1A in the second implementation. Therefore, same signs are attached to the same elements and corresponding elements and explanation thereof is omitted.

As shown in FIG. 6, the through holes and the female screws for inserting the members 20, each forming the second flow path 7B and the second supply port 8B, may be formed at plural positions of the body 5 different in the tool axis direction. Then, the second flow paths 7B and the second supply ports 8B can be formed at different positions in the tool axis direction of the drill 2. In the example shown in FIG. 6, the members 20 are respectively attached to two different positions of the body 5 in the tool axis direction so that the members 20 can be attached and detached to and from the body 5.

When the second flow paths 7B and the second supply ports 8B are formed at different positions in the tool axis direction, even after the second supply port 8B closest to the cutting edge part 6 has been exposed from the space between the guide bush 3 and the body 5, to which the cutting oil should be supplied, because of the progression of drilling the workpiece W, the cutting oil can be continuously supplied to the space between the guide bush 3 and the body 5 from another second supply port 8B formed at a different position in the tool axis direction. Consequently, the length of the body 5 which can be fed out in the tool axis direction toward the workpiece W with sliding fit to the guide bush 3 by supply of the cutting oil can be increased. As a result, a deep hole can be drilled using the guide bush 3 as shown in FIG. 7.

Therefore, the distance between the adjacent second supply ports 8B can be determined according to a length of the guide bush 3 to which lubricity to the body 5 should be given. As explained in the first implementation, the cutting oil discharged out from each second supply port 8B remains as an oil film, during a certain length of period, on the surface of the body 5 and inside of the guide bush 3. Accordingly, it is appropriate to determine the distance between the adjacent second supply ports 8B so that an oil film may not break off between the guide bush 3 and the body 5 even when the body 5 is slid relative to the guide bush 3 by sending out the drill 2 in the tool axis direction.

When it is a case where reducing the number of the members 20 is thought as important, the second supply ports 8B can be arranged at an interval at which an oil film would not break off between the guide bush 3 and the body 5. As a concrete example, the distance between the second supply ports 8B can be determined so that the cutting oil discharged out from the second supply port 8B adjacent the shank 5A side of the body 5 may arrive at the space, to which the cutting oil should be supplied, between the guide bush 3 and the body 5 through the body 5 before the second supply port 8B in the cutting edge part 6 side is exposed from the space between the guide bush 3 and the body 5.

Alternatively, when it is a case where ensuring the lubricity between the guide bush 3 and the body 5 is thought as important, the distance between the second supply ports 8B can be determined so that the second supply port 8B adjacent the shank 5A side of the body 5 may arrive at the space, to which the cutting oil should be supplied, between the guide bush 3 and the body 5 before the second supply port 8B in the cutting edge part 6 side is exposed from the space between the guide bush 3 and the body 5, for example. That is, the distance between the second supply ports 8B can be determined to not more than the length in the tool axis direction of the space, to which the cutting oil should be supplied, between the guide bush 3 and the body 5, i.e., the length of the guide bush 3 which slidingly fits to the body 5.

On the other hand, it is enough to form the single second supply port 8B in the same position in the tool axis direction, as explained in the first implementation. Accordingly, forming the single second supply port 8B in the same position in the tool axis direction leads to simplification of the structure of the drill 2 and reduction of a manufacturing cost of the drill 2. Nevertheless, the number of the second supply ports 8B formed in the same position in the tool axis direction may be more than one in order to obtain a sufficient amount of supply of a cutting oil to the space between the guide bush 3 and the body 5 regardless of drilling conditions.

In the case of enabling it to form the second supply ports 8B at different positions in the tool axis direction, the second supply port B in the shank 5A side of the body 5 may become unnecessary for drilling a shallow hole. Accordingly, a plug member for blockading the second flow path 7B and the second supply port 8B may be inserted to the through hole and the female screw which have been formed in the body 5, instead of the member 20 for forming the second flow path 7B and the second supply port 8B.

Figure 8:
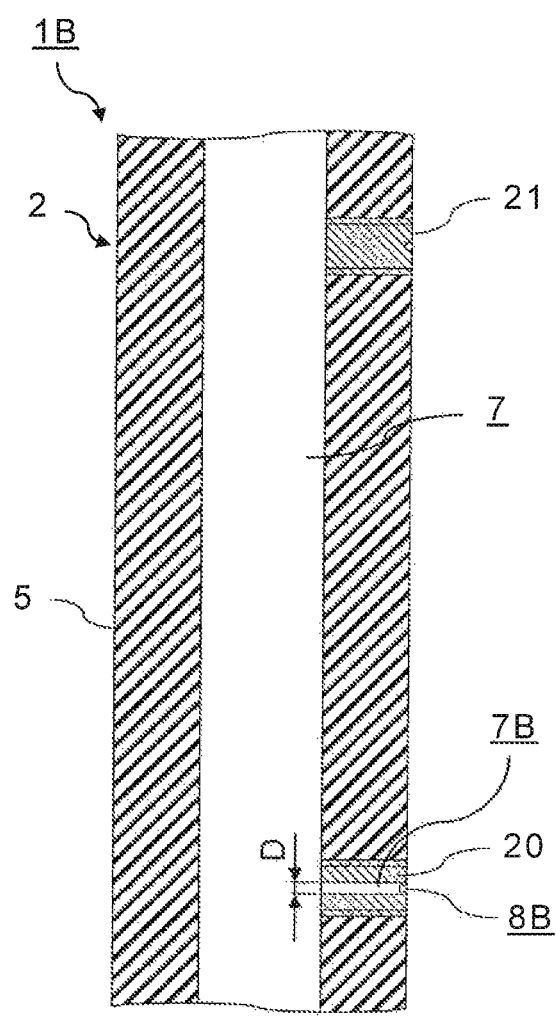
FIG. 8 is a longitudinal sectional view of the body showing an example case where the through hole for inserting the member shown in FIG. 6 is blockaded with the plug member.

FIG. 8 is a longitudinal sectional view of the body 5 showing an example case where the through hole for inserting the member 20 shown in FIG. 6 is blockaded with the plug member 21.

As exemplified in FIG. 8, when the columnar plug member 21 of which a male screw has been formed on the outer circumference is produced, the plug member 21 can be attached and detached to and from the body 5. Thereby, the second flow path 7B and the second supply port 8B can be blockaded by fastening the male screw of the plug member 21 to the female screw formed in the through hole for insertion of the member 20, as necessary, such as a case of drilling a shallow hole. As a result, supply of useless cutting oil can be reduced.

The plug member 21 which blockades the second flow path 7B and the second supply port 8B can be also used to the drill 2 in the second implementation. When the second flow path 7B and the second supply port 8B which can be formed in the drill 2 in the second implementation are blockaded by the plug member 21, the drill 2 can be used even in the case of drilling without using the guide bush 3. Namely, flexibility can be given to the drill 2.

Next, an example case where the drilling unit 1B is composed by an insert drill of which cutting edges can be exchanged will be described.

Figure 9:
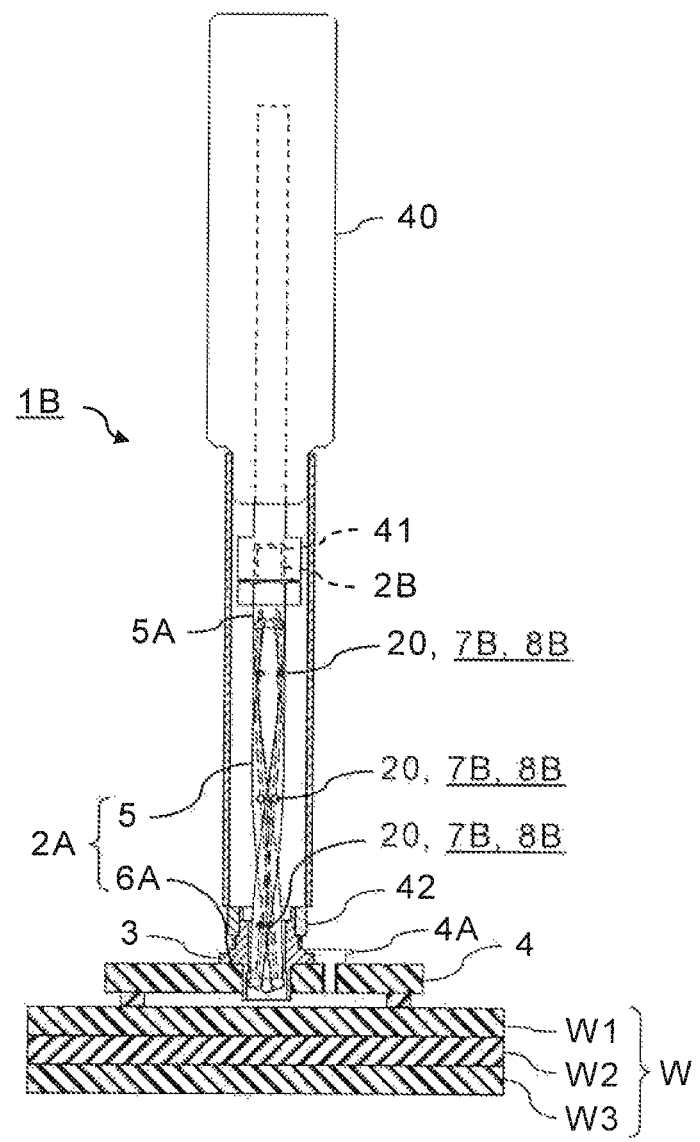
FIG. 9 is a longitudinal sectional view showing an example case where the drilling unit is composed by an insert drill of which body has helical flutes and cutting edges can be exchanged.
Figure 10:
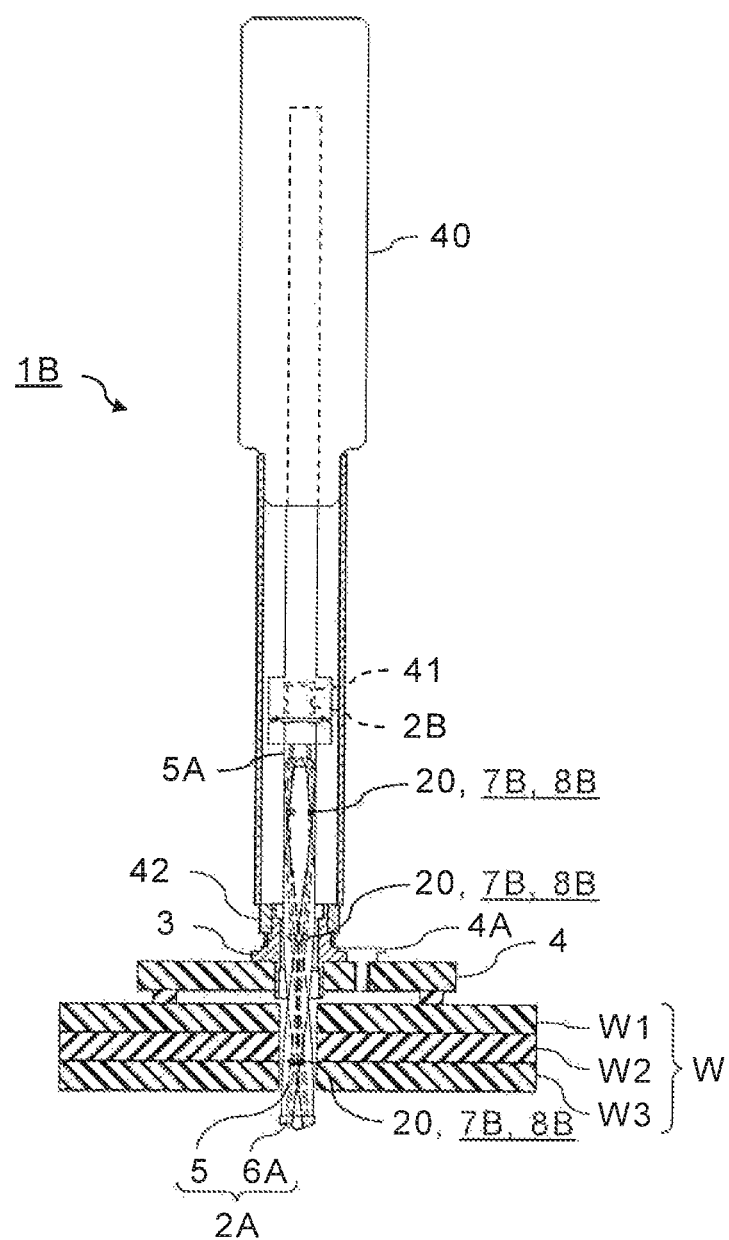
FIG. 10 is a longitudinal sectional view showing a state where the drilling unit shown in FIG. 9 is drilling a workpiece.
Figure 11:
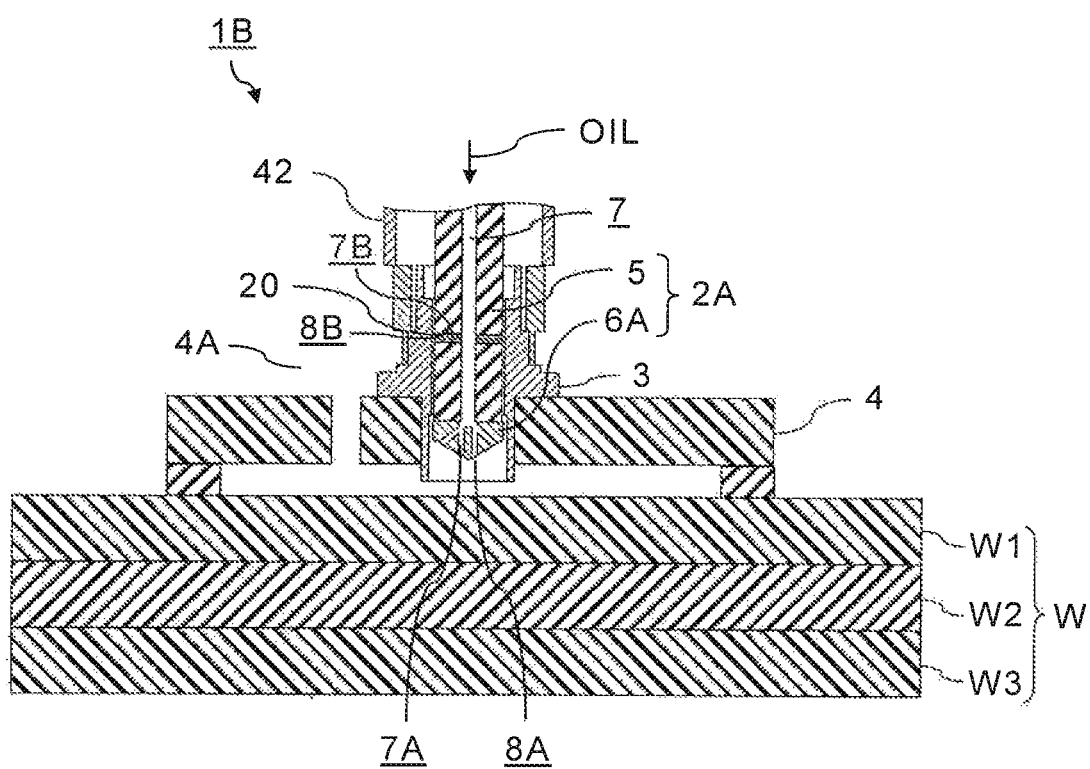
FIG. 11 is an enlarged vertical longitudinal sectional view near the tip of the insert drill shown in FIG. 9.
Figure 12:
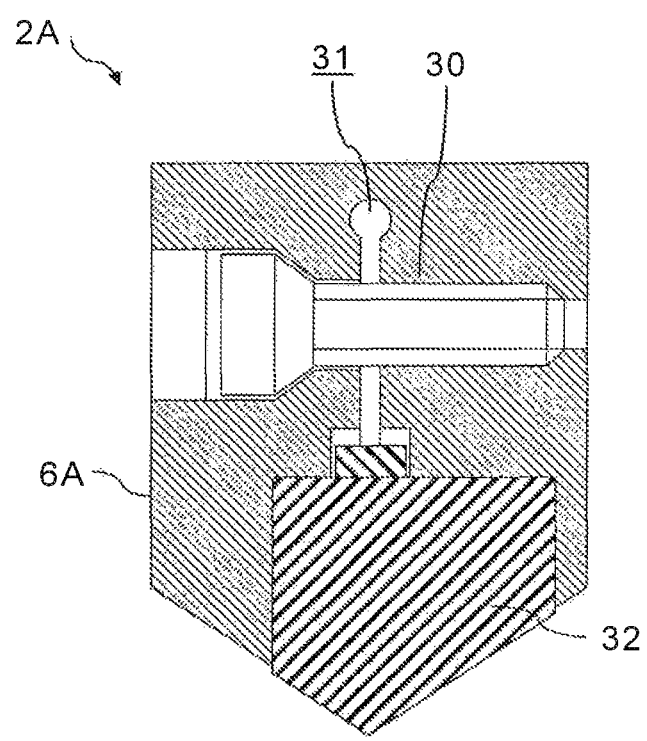
FIG. 12 is a longitudinal sectional view showing an example of structure in the cutting edge part of the insert drill shown in FIG. 9.

FIG. 9 is a longitudinal sectional view showing an example case where the drilling unit 1B is composed by an insert drill 2A of which body 5 has helical flutes and cutting edges can be exchanged. FIG. 10 is a longitudinal sectional view showing a state where the drilling unit 1B shown in FIG. 9 is drilling a workpiece W. FIG. 11 is an enlarged vertical longitudinal sectional view near the tip of the insert drill 2A shown in FIG. 9. FIG. 12 is a longitudinal sectional view showing an example of structure in the cutting edge part 6A of the insert drill 2A shown in FIG. 9.

As exemplified in FIG. 9 to FIG. 12, the drilling unit 1B can be composed of the insert drill 2A. The structure of the cutting edge part 6A of the insert drill 2A can be made to the structure in which the width of the slit 31 can be changed by fastening the bolt 30 as shown in FIG. 12, for example. Specifically, when the bolt 30 is fastened to make the width of the slit 31 narrow, the cutting edge 32 can be inserted and held by the cutting edge part 6A. On the contrary, when the bolt 30 is loosened to make the width of the slit 31 expanded, the cutting edge 32 can be removed from the cutting edge part 6A.

Such structure of the cutting edge part 6A including one having oil holes is already put into practical use, and can be manufactured easily. Then, the drilling unit 1B can be configured by the insert drill 2A of which the cutting edge part 6A and the body 5 function as a holder of the cutting edge 32.

In the example shown in FIG. 9 and FIG. 10, the body 5 of the insert drill 2A on which helical flutes have been formed has the six second flow paths 7B and the six second supply ports 8B. Specifically, the two second flow paths 7B and the two second supply ports 8B are formed at each of three positions different in the tool axis direction. Accordingly, a deep hole can be processed using the insert drill 2A. The second flow path 7B and the second supply port 8B can be formed in any of a flute portion and a margin portion, as exemplified in FIG. 9 and FIG. 10.

The insert drill 2A can be used with being attached to a handheld drill driving device 40. In the example shown in FIG. 9 and FIG. 10, the male screw 2B is formed in the back end side of the insert drill 2A so that the male screw 2B of the insert drill 2A is fasten to the female screw 41 which has been formed in the handheld drill driving device 40, thereby the insert drill 2A is held by the drill driving device 40.

The drill driving device 40 has the cylindrical nosepiece 42 which shields the insert drill 2A, and the nosepiece 42 is connected with the guide bush 3. Specifically, the male screw which has been formed on the external surface of the guide bush 3 is fastenable to the female screw which has been formed inside of the tip side of the nosepiece 42, thereby the nosepiece 42 is connected with the guide bush 3.

Therefore, not only the insert drill 2A and the guide bush 3 but the handheld drill driving device 40 having the nosepiece 42 which has a structure connectable to the guide bush 3 may be an element of the drilling unit 1B. This is the same in the first implementation and the second implementation.

According to the drilling unit 1B in the above mentioned third implementation, the second flow paths 7B and the second supply ports 8B can be formed at different positions in the tool axis direction of the drill 2 so that a deep hole can be processed. Moreover, the second flow path 7B and the second supply port 8B can also be blockaded by the plug member 21 so that a shallow hole can also be processed.

(Fourth Implementation)

Figure 13:
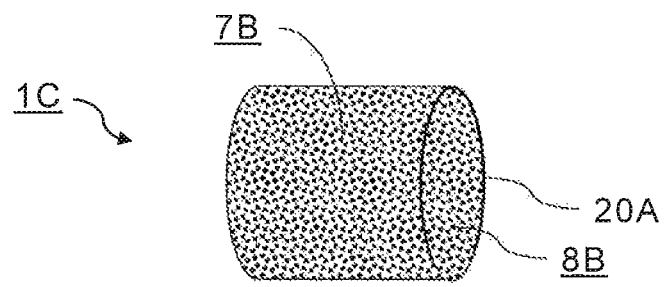
FIG. 13 is a perspective view showing the first structural example of a member inserted into at least one through hole formed in a body of a drill according to the fourth implementation of the present invention.
Figure 14:
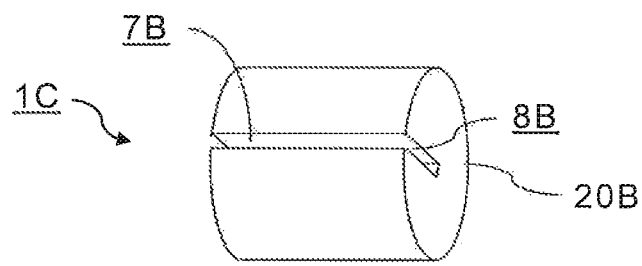
FIG. 14 is a perspective view showing the second structural example of a member inserted into at least one through hole formed in a body of a drill according to the fourth implementation of the present invention.

FIG. 13 is a perspective view showing the first structural example of a member inserted into at least one through hole formed in a body of a drill according to the fourth implementation of the present invention. FIG. 14 is a perspective view showing the second structural example of a member inserted into at least one through hole formed in a body of a drill according to the fourth implementation of the present invention.

The drilling unit 1C in the fourth implementation shown in FIG. 13 or FIG. 14 is different from each of the drilling unit 1, the drilling unit 1A and the drilling unit 1B in the other implementations in the point that the respective pressure losses of the second flow paths 7B formed in the body 5 of the drill 2 are determined so that the cutting oil may be exuded from the second supply ports 8B formed on the outer peripheral surface of the body 5 as the outlets of the second flow paths 7B respectively without being scattered from the second supply ports 8B in the radial direction of the body 5. Other structures and functions of the drilling unit 1C in the fourth implementation do not substantially differ from those of the drilling unit 1, the drilling unit 1A and the drilling unit 1B in the other implementations. Therefore, only a member 20A, a member 20B and a member 20C each forming the second flow path 7B are illustrated. Then, the same signs are attached to the same elements and the corresponding elements, and explanation thereof is omitted.

The pressure loss of each second flow path 7B becomes larger as the area of the cross section is smaller since the frictional resistance with the cutting oil increases. Thus, the cross section area of at least a part of each second flow path 7B can be determined so that the pressure loss of the second flow path 7B becomes one with which the cutting oil is exuded without being scattered from the second supply port 8B in the radial direction of the body 5.

As a practical example, the pressure loss of each second flow path 7B can be increased by inserting the column-shaped member 20A, made of a porous material as exemplified in FIG. 13, in a hole reaching the first flow path 7A from the outer surface of the body 5. Specifically, forming at least a part of each second flow path 7B with a porous material makes it possible to make the pressure loss of each second flow path 7B be a pressure loss by which the cutting oil is not scattered from the second supply port 8B in the radial direction of the body 5 but exuded from the second supply port 8B.

Concrete examples of porous material include porous aluminum in addition to felt (a non-woven fabric), pumice stone and the like. In particular, when porous aluminum of which workability and wear resistance are preferable is used, it becomes easy to produce the member 20A, which forms the second flow path 7B, and attach the member 20A to the body 5.

As another concrete example, the member 20B forming the second flow path 7B whose cross section area has been adjusted as exemplified in FIG. 14 may also be inserted in each through hole formed in the body 5, similarly to the second implementation. Although FIG. 14 shows an example case where a slit having a rectangular cross section has been formed, as the second flow path 7B, in the member 20B, the second flow path 7B having a circular cross section may be formed in the member 20B. Alternatively, the second flow path 7B having an adjusted cross section area may be formed directly in the body 5, similarly to the first implementation.

When a male screw is formed in the outer surface of the member 20B and fastened to a female screw formed in each through hole of the body 5, similarly to the second implementation, the member 20B forming the second flow path 7B can be exchanged. Therefore, the plurality of the members 20B respectively forming the second flow paths 7B having pressure losses different from each other may be prepared so that one of the members 20B can be interchangeably attached to the body 5. When a slit is the second flow path 7B as exemplified in FIG. 14, a direction of the slit may also be changed. Accordingly, a direction of a slit and/or the size of the second flow path 7B may be changed according to cutting conditions, such as a supply pressure and a kind of the cutting oil, the size and rotation speed of the drill 2, a material of the workpiece W and a depth of a hole to be drilled.

Some actual drilling examinations under various conditions revealed the following fact. A condition that the maximum width of the cross section of at least a part of the second flow path 7B is not more than 0.5 mm is important in order to prevent the cutting oil from scattering from the second supply port 8B in the radial direction of the body 5 even when the body 5 is rotated while the cutting oil is supplied to the flow path 7 in the body 5. Therefore, it is appropriate that each second flow path 7B is a small clearance of which inside diameter or width is about not more than 0.5 mm.

For that reason, the columnar member 20 which is not hollow and has a male screw on the outer surface, like the plug member 21 shown in FIG. 8, may be fastened to a female screw formed in each through hole of the body 5 so that a clearance formed between the male screw formed on the columnar member 20 and the female screw formed in each through hole of the body 5 can be used as the second flow path 7B.

Figure 15:
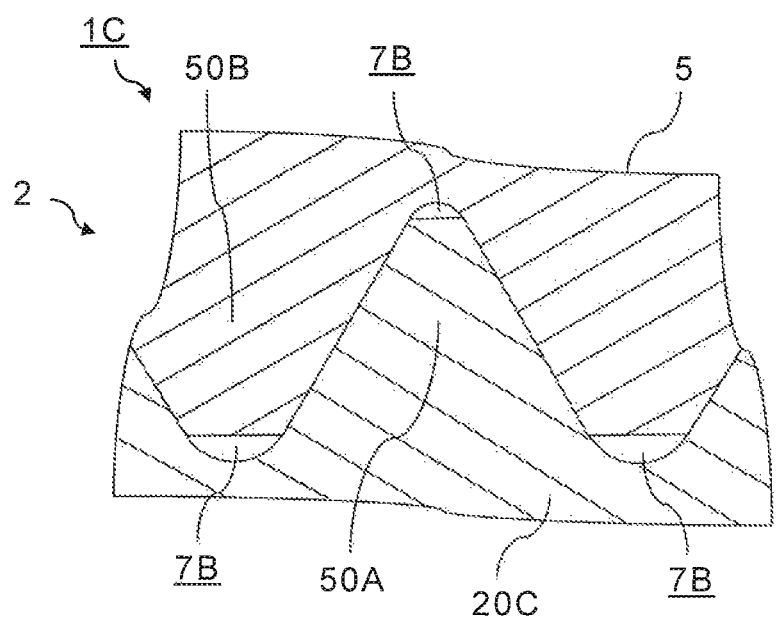
FIG. 15 is an enlarged partial sectional view of the body and the columnar member, showing an example in which a clearance formed between a male screw and a female screw is used as the second flow path.

FIG. 15 is an enlarged partial sectional view of the body 5 and the columnar member 20C, showing an example in which a clearance formed between a male screw and a female screw is used as the second flow path 7B.

As shown in FIG. 15, a male screw 50A can be formed on the outer surface of the columnar member 20C while a female screw 50B can be formed in each through hole of the body 5. When the male screw 50A formed on the columnar member 20C is fastened to the female screw 50B formed in a through hole of the body 5, a clearance, called a crest clearance of the male screw 50A, is formed between the thread of the male screw 50A and the root of the female screw 50B while a clearance, called a root clearance of the male screw 50A, is formed between the root of the male screw 50A and the thread of the female screw 50B, as long as tolerance classes of the male screws 50A and the female screw 50B are typical respectively.

Accordingly, each of the clearances formed between the male screw 50A and the female screw 50B can be used as the second flow path 7B for discharging and exuding the cutting oil from the body 5. In this case, the second flow path 7B become spiral and the width of the second flow path 7B can be adjusted by selecting tolerance classes of a male screw and a female screw which classify fitting between the male screw and the female screw into classifications including precise, middle and rough.

On the contrary, when the second flow path 7B is blockaded by the plug member 21 shown in FIG. 8, it is important to adopt a specification of a pair of screws in which a clearance from which the cutting oil may leak is not generated between the male screw formed on the plug member 21 and the female screw formed in each through hole of the body 5, similarly to a case using a pipe thread.

In addition to the above-mentioned example, at least one of central axes of the second flow paths 7B may be slanted in the workpiece W side so that the cutting oil may be discharged not in the rotating radial direction of the body 5 but toward the workpiece W side. Moreover, it is experientially important to form the flow paths 7 so that the amount of the cutting oil supplied to the first supply ports 8A formed as the outlets of the first flow paths 7A respectively becomes not less than twice the amount of the cutting oil supplied to the second supply ports 8B formed as the outlets of the second flow paths 7B respectively, from a viewpoint of avoiding shortage in the cutting oil which should be supplied to the first flow paths 7A and the first supply ports 8A, as a result that an excess amount of the cutting oil has been supplied to the second flow paths 7B and the second supply ports 8B.

According to the drilling unit 1C in the above-mentioned fourth implementation, it can be prevented that an excess amount of the cutting oil is supplied to the second flow paths 7B and the second supply ports 8B. As a result, it becomes possible to prevent the cutting oil from scattering from the second supply ports 8B which have been exposed to the outside of the guide bush 11. Alternatively, the amount of the cutting oil scattering from the second supply ports 8B which have been exposed to the outside of the guide bush 11 can be reduced.

On the other hand, a sufficient amount of the cutting oil can be supplied to the first flow paths 7A and the first supply ports 8A. That is, a pressure of the cutting oil supplied to the first flow paths 7A and the first supply ports 8A can be secured since a pressure loss due to scattering of the cutting oil from the second supply ports 8B can be remarkably reduced.

Moreover, cleaning work after drilling of the workpiece W becomes easy since the cutting oil scattering from the second supply ports 8B can be eliminated or at least an amount of the cutting oil scattering from the second supply ports 8B can be decreased.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:
1. A drill comprising:
   a body without a back taper, the body having a flow path of a cutting oil inside, the flow path being branched to a first flow path and a second flow path inside the body; and a cutting edge part integrated with the body, the cutting edge part having a first supply port that supplies the cutting oil toward a workpiece and in a direction that includes a vertical vector directed at an underlying surface of the workpiece, the first supply port being an outlet of the first flow path and positioned as to supply cutting oil to the underlying surface during drill rotation, wherein the body has a second supply port that supplies the cutting oil to a clearance formed between the body and a bush for positioning the body, the bush being used by inserting the body inside the bush, the second supply port being an outlet of the second flow path, the outlet of the second flow path being formed on an outer peripheral surface of the body, the second flow path having a pressure loss by which the cutting oil is not scattered from the second supply port in a radial direction of the body but exuded from the second supply port, and wherein the first supply port that supplies the cutting oil toward a workpiece has a central vertical axis that extends through the surface of the workpiece, and the first supply port remains open during rotation of the drill.

2. The drill according to claim 1, wherein a cross section of at least a part of the second flow path has an area causing the pressure loss, and wherein a maximum width of the cross section of at least a part of the second flow path is not more than 0.5 mm.

3. The drill according to claim 2, wherein the first flow path supplies a first quantity of the cutting oil to the first supply port while the second flow path supplies a second quantity of the cutting oil to the second supply port, the first quantity being not less than twice the second quantity.

4. The drill according to claim 2, wherein a diameter of the cutting edge part is larger than a diameter of the body in a cutting edge part side.

5. The drill according to claim 2, wherein members forming second supply ports having different pressure losses respectively have been interchangeably attached to the body.

6. The drill according to claim 1, wherein at least a part of the second flow path has been formed by a porous material or a clearance between a male screw and a female screw, the porous material or the clearance between the male screw and the female screw causing the pressure loss.

7. The drill according to claim 6, wherein the first flow path supplies a first quantity of the cutting oil to the first supply port while the second flow path supplies a second quantity of the cutting oil to the second supply port, the first quantity being not less than twice the second quantity.

8. The drill according to claim 6, wherein the body and the cutting edge part form a holder that holds at least one cutting edge interchangeably.

9. The drill according to claim 6, wherein a diameter of the cutting edge part is larger than a diameter of the body in a cutting edge part side.

10. The drill according to claim 1, wherein the body and the cutting edge part form a holder that holds at least one cutting edge interchangeably.

11. A drilling unit comprising:
the drill according to claim 10; and
the bush,
wherein the bush has a step through hole consisting of a first hole having a first diameter and a second hole having a second diameter smaller than the first diameter, the first hole guiding the cutting edge part in a workpiece side, the second hole guiding the body.

12. The drill according to claim 1, wherein a diameter of the cutting edge part is larger than a diameter of the body in a cutting edge part side.

13. The drill according to claim 1, wherein members forming second supply ports having different pressure losses respectively have been interchangeably attached to the body.

14. A drilling unit comprising:
the drill according to claim 1; and
the bush.

15. The drilling unit according to claim 14, further comprising:
a drill driving device having a nosepiece coupled to the bush.

16. A drilling method for producing a drilled product comprising:
using at least the drill according to claim 1 and the bush for drilling the workpiece; and
supplying the cutting oil.

17. A drill comprising:
a body without a back taper, the body having a flow path of a cutting oil inside, the flow path being branched to a first flow path and a second flow path inside the body; and
a cutting edge part integrated with the body, the cutting edge part having a first supply port that supplies the cutting oil toward a workpiece, the first supply port being an outlet of the first flow path,
wherein the body has a second supply port that supplies the cutting oil to a clearance formed between the body and a bush for positioning the body, the bush being used by inserting the body inside the bush, the second supply port being an outlet of the second flow path, the outlet of the second flow path being formed on an outer peripheral surface of the body, the second flow path having a pressure loss by which the cutting oil is not scattered from the second supply port in a radial direction of the body but exuded from the second supply port, and
wherein the first flow path supplies a first quantity of the cutting oil to the first supply port while the second flow path supplies a second quantity of the cutting oil to the second supply port, the first quantity being not less than twice the second quantity.

18. A drill comprising:
a body without a back taper, the body having a flow path of a cutting oil inside, the flow path being branched to a first flow path and a second flow path inside the body; and
a cutting edge part integrated with the body, the cutting edge part having a first supply port that supplies the cutting oil toward a workpiece and in a direction that includes a vertical vector directed at an underlying surface of the workpiece, the first supply port being an outlet of the first flow path and positioned as to supply cutting oil to the underlying surface during drill rotation,
wherein the body has a second supply port that supplies the cutting oil to a clearance formed between the body and a bush for positioning the body, the bush being used by inserting the body inside the bush, the second supply port being an outlet of the second flow path, the outlet of the second flow path being formed on an outer peripheral surface of the body, the second flow path having a pressure loss by which the cutting oil is not scattered from the second supply port in a radial direction of the body but exuded from the second supply port, wherein a cross section of at least a part of the second flow path has an area causing the pressure loss, and wherein a maximum width of the cross section of at least a part of the second flow path is not more than 0.5 mm, and wherein at least a part of the second flow path has been formed by a porous material or a clearance between a male screw and a female screw, the porous material or the clearance between the male screw and the female screw causing the pressure loss.

19. A drill comprising:

a body without a back taper, the body having a flow path of a cutting oil inside, the flow path being branched to a first flow path and a second flow path inside the body; and a cutting edge part integrated with the body, the cutting edge part having a first supply port that supplies the cutting oil toward a workpiece and in a direction that includes a vertical vector directed at an underlying surface of the workpiece, the first supply port being an outlet of the first flow path and positioned as to supply cutting oil to the underlying surface during drill rotation, wherein the body has a second supply port that supplies the cutting oil to a clearance formed between the body and a bush for positioning the body, the bush being used by inserting the body inside the bush, the second supply port being an outlet of the second flow path, the outlet of the second flow path being formed on an outer peripheral surface of the body, the second flow path having a pressure loss by which the cutting oil is not scattered from the second supply port in a radial direction of the body but exuded from the second supply port, wherein a cross section of at least a part of the second flow path has an area causing the pressure loss, and wherein a maximum width of the cross section of at least a part of the second flow path is not more than 0.5 mm, and wherein the body and the cutting edge part form a holder that holds at least one cutting edge interchangeably.

20. A drill comprising:

a body without a back taper, the body having a flow path of a cutting oil inside, the flow path being branched to a first flow path and a second flow path inside the body; and a cutting edge part integrated with the body, the cutting edge part having a first supply port that supplies the cutting oil toward a workpiece, the first supply port being an outlet of the first flow path, wherein the body has a second supply port that supplies the cutting oil to a clearance formed between the body and a bush for positioning the body, the bush being used by inserting the body inside the bush, the second supply port being an outlet of the second flow path, the outlet of the second flow path being formed on an outer peripheral surface of the body, the second flow path having a pressure loss by which the cutting oil is not scattered from the second supply port in a radial direction of the body but exuded from the second supply port, wherein at least a part of the second flow path has been formed by a porous material or a clearance between a male screw and a female screw, the porous material or the clearance between the male screw and the female screw causing the pressure loss, and wherein members forming second supply ports having different pressure losses respectively have been interchangeably attached to the body.

* * * * *